US012698138B2

(12) United States Patent
Barrette et al.

(10) Patent No.: US 12,698,138 B2
(45) Date of Patent: Aug. 4, 2026

(54) CYLINDRICAL CONTAINER AND DISPENSER

(71) Applicant: Parcel Health, Inc., Pittsburgh, PA (US)

(72) Inventors: Alex Nunes Barrette, Richmond, VA (US); Mallory Walsh Barrett, Richmond, VA (US); Melinda Su-En Lee, Pittsburgh, PA (US)

(73) Assignee: Parcel Health, Inc., Pittsburgh, PA (US)

( * ) Notice: Subject to any disclaimer, the term of this patent is extended or adjusted under 35 U.S.C. 154(b) by 0 days.

(21) Appl. No.: 18/794,279

(22) Filed: Aug. 5, 2024

(65) Prior Publication Data

US 2025/0136333 A1 May 1, 2025

Related U.S. Application Data

(60) Provisional application No. 63/545,955, filed on Oct. 27, 2023.

(51) Int. Cl.

*B65D 43/02* (2006.01)
*A61J 1/03* (2023.01)
*B65D 43/04* (2006.01)
*B65D 50/04* (2006.01)
*B65D 59/02* (2006.01)

(52) U.S. Cl.

CPC .............. *B65D 50/046* (2013.01); *A61J 1/03* (2013.01); *B65D 59/02* (2013.01)

(58) Field of Classification Search

CPC ......... A61J 1/03; B65D 50/046; B65D 59/02; B65D 59/04; B65D 59/06; B65D 59/08; B65D 2543/00268; B65D 59/00

USPC ........... 215/224, DIG. 3, 296, 355; 220/796, 220/DIG. 19, DIG. 20, 916; 229/93, 4.5

See application file for complete search history.

(56) References Cited

U.S. PATENT DOCUMENTS

| | | | | |
|---|---|---|---|---|
| 2,049,379 | A * | 7/1936 | Hosking | B65D 43/022 229/125.17 |
| 2,309,341 | A * | 1/1943 | Condon | B65D 15/06 413/5 |
| 3,119,541 | A * | 1/1964 | Lynn | B65D 51/242 229/5.5 |
| 3,998,354 | A | 12/1976 | Song | |
| 4,163,517 | A * | 8/1979 | Kappler | B65D 15/08 220/916 |
| 8,181,847 | B1 * | 5/2012 | Erdie | B65D 43/021 229/125.17 |
| D710,694 | S * | 8/2014 | D'Anglade | D9/435 |
| 2005/0161463 | A1 * | 7/2005 | Litchman | B65D 59/02 220/916 |
| 2005/0173504 | A1 * | 8/2005 | Erdie | B65D 59/02 229/125.17 |
| 2005/0205649 | A1 * | 9/2005 | Erdie | B65D 59/06 229/125.17 |
| 2010/0084361 | A1 * | 4/2010 | Dayton | B31C 9/00 493/93 |

(Continued)

*Primary Examiner* — Gideon R Weinerth
(74) *Attorney, Agent, or Firm* — Butzel Long

(57) ABSTRACT

A locking adapter for a container and a container are provided, in which the locking adapter is secured within and onto the cylindrical body by way of an outward-directed force applied by the locking adapter to the interior of the cylindrical body. The locking adapter may be removed by use of one or more buttons and/or a removable portion.

11 Claims, 10 Drawing Sheets

(56) References Cited

U.S. PATENT DOCUMENTS

| | | | | |
|---|---|---|---|---|
| 2011/0108553 | A1* | 5/2011 | Pantelleria | B65D 43/169<br>29/525 |
| 2011/0284535 | A1* | 11/2011 | Ide | B65D 15/24<br>220/200 |
| 2012/0175336 | A1 | 7/2012 | Miller | |
| 2013/0140306 | A1* | 6/2013 | D'Anglade | B65D 15/04<br>220/4.28 |
| 2015/0300552 | A1* | 10/2015 | Chang | B65D 59/02<br>138/89 |
| 2016/0368662 | A1* | 12/2016 | Morgan | A45C 11/20 |
| 2020/0122905 | A1 | 4/2020 | Agrawal | |
| 2021/0061528 | A1* | 3/2021 | Ting | B65D 50/046 |
| 2022/0185553 | A1 | 6/2022 | Savage | |
| 2023/0348156 | A1* | 11/2023 | Moore | B65D 65/466 |
| 2024/0253879 | A1* | 8/2024 | Corazza | B65D 33/2541 |
| 2025/0136333 | A1* | 5/2025 | Barrette | A61J 1/1425 |
| 2026/0035126 | A1* | 2/2026 | Hsu | B65D 3/04 |
| 2026/0069501 | A1* | 3/2026 | Wheeler | A61J 1/1468 |

* cited by examiner

CYLINDRICAL CONTAINER AND DISPENSER

CROSS-REFERENCE TO RELATED APPLICATIONS

This application claims the priority benefit of U.S. Provisional Application No. 63/545,955, filed Oct. 27, 2023, the disclosure of which is incorporated by reference in its entirety.

BACKGROUND

Containers for holding and dispensing medications and the like typically come in one of several forms. For example, a plastic bottle with a child-protective cap may be used. As another example, individual doses of medication may be sealed in "blister packs" of plastic, foil, or other materials that allow a patient to dispense a single dose of medication while leaving unused doses sealed in the original package.

DETAILED DESCRIPTION

Embodiments disclosed herein provide containers suitable for holding and dispensing medications, vitamins, supplements, and the like, though the use of devices disclosed herein is not limited thereto. A container as disclosed herein may be fabricated at least in part from a recyclable material such as paper, cardstock, cardboard, or the like. The material may be coated or otherwise treated to provide waterproofing or otherwise prevent or reduce the ability of water or other external material to penetrate the container, and/or to prevent or reduce other environmental damage. Containers disclosed herein also may include various locking mechanisms that prevent the containers from being opened unless first placed in a specific arrangement and/or unless a user actively disengages the mechanism.

Containers disclosed herein may be formed from a cylindrical body, to which a locking adapter may be secured via one or more pressure-based or interlocking components that connect the adapter to the cylindrical body. The adapter may include a removable cap, for example to allow for filling the device. The removable cap may be child-proof, child-resistant, or the like, as is known in the art. For example, the cap and locking adapter may feature any suitable pressure interlock mechanism that requires a downward force on the cap to allow the cap to rotate and/or to be removed from the locking adapter.

Figure 1:
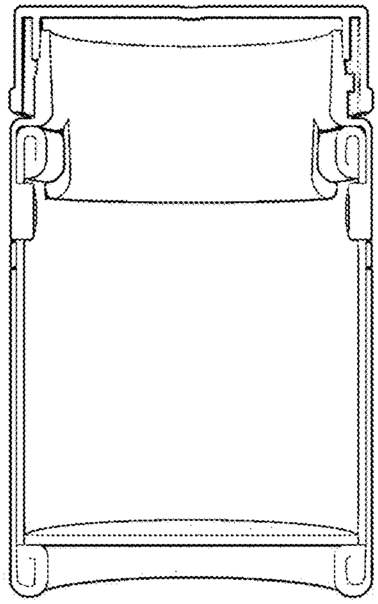
FIG. 1 shows a side cross-sectional view from the left side of a container and dispenser device as disclosed herein.
Figure 2:
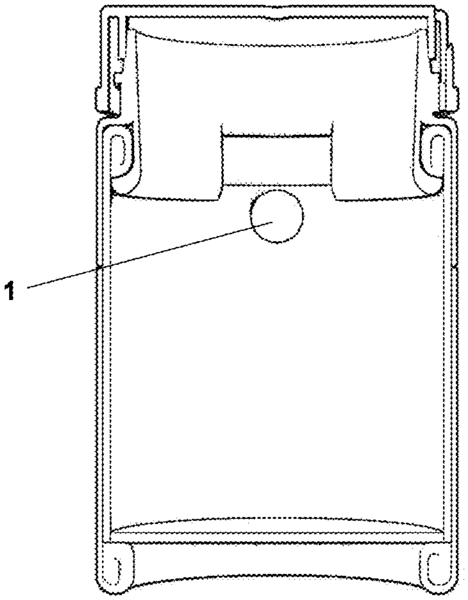
FIG. 2 shows a side cross-sectional view from the right side (i.e., opposite the view shown in FIG. 1) of a container and dispenser device as disclosed herein.
Figure 3:
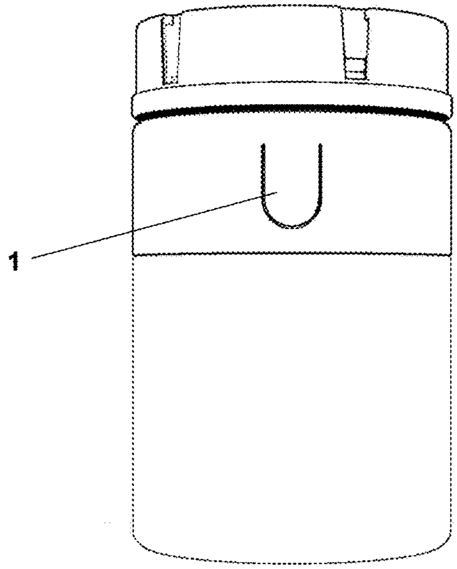
FIG. 3 shows an outer view of a container and dispenser as disclosed herein.
Figure 4:
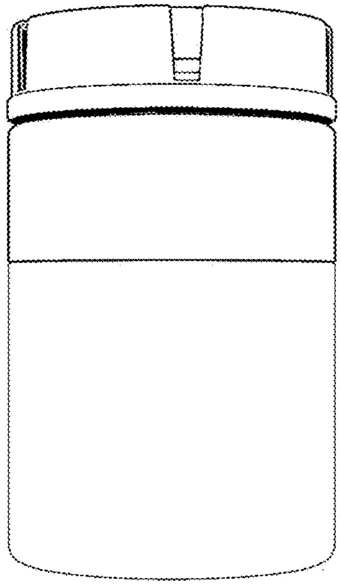
FIG. 4 shows an outer view of a container and dispenser as disclosed herein.
Figure 5:
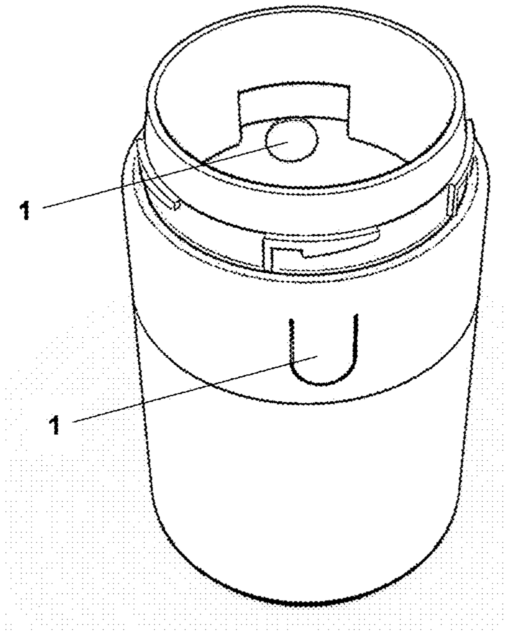
FIG. 5 shows a perspective view of a container and dispenser as disclosed herein, with the cap removed from the top adapter.
Figure 6:
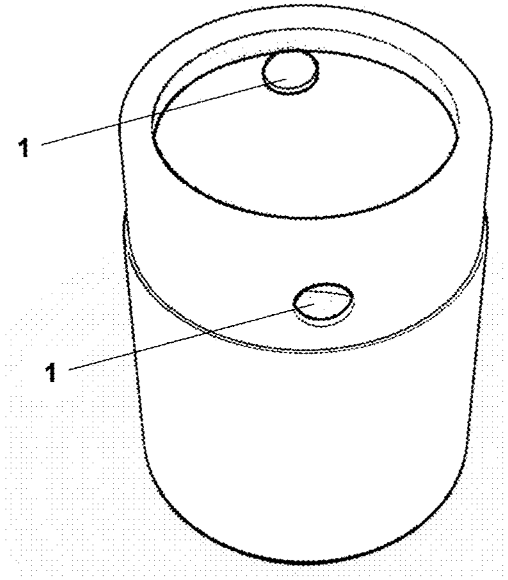
FIG. 6 shows a perspective view of a container and dispenser as disclosed herein, with the cap secured to the top adapter.
Figure 7:
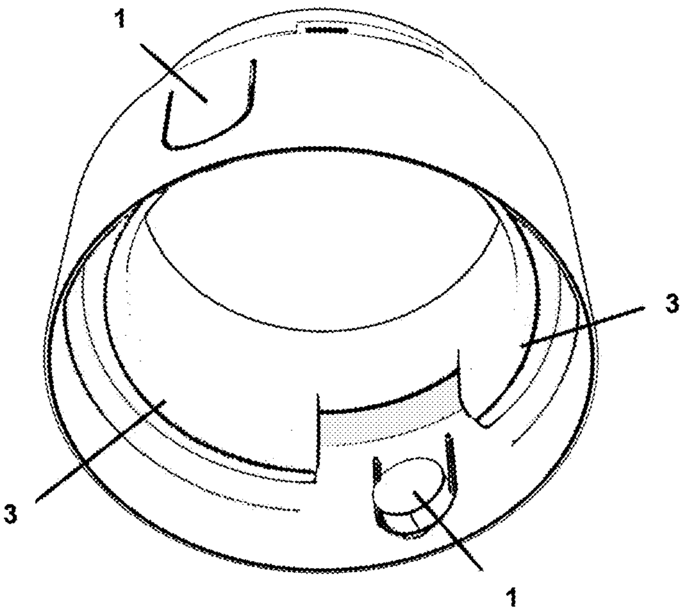
FIG. 7 shows a perspective view of a top adapter of a device as disclosed herein, viewed from below and showing a portion of the top adapter that is securable to the cylindrical body.
Figure 8:
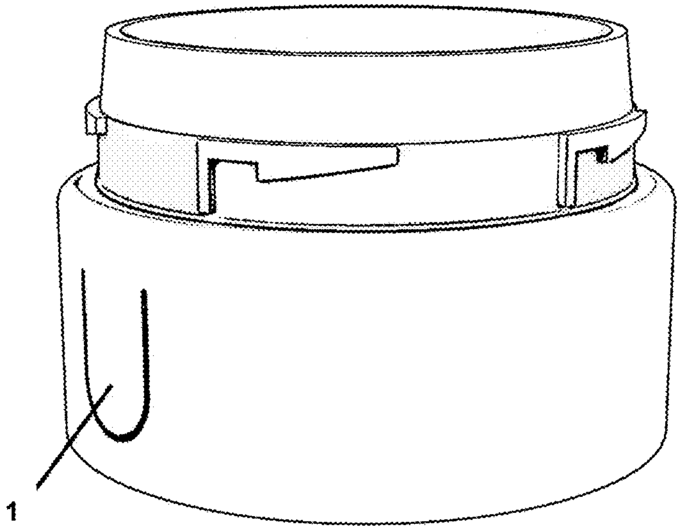
FIG. 8 shows a side view of a top adapter of a device as disclosed herein.
Figure 9:
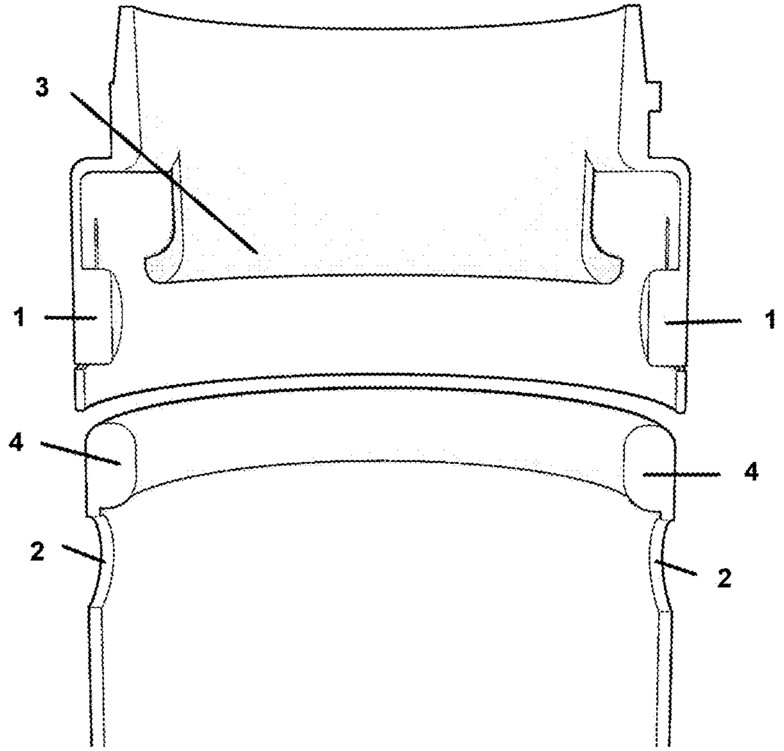
FIG. 9 shows a cross-sectional view of a cylindrical body and a locking top adapter as disclosed herein.
Figure 10:
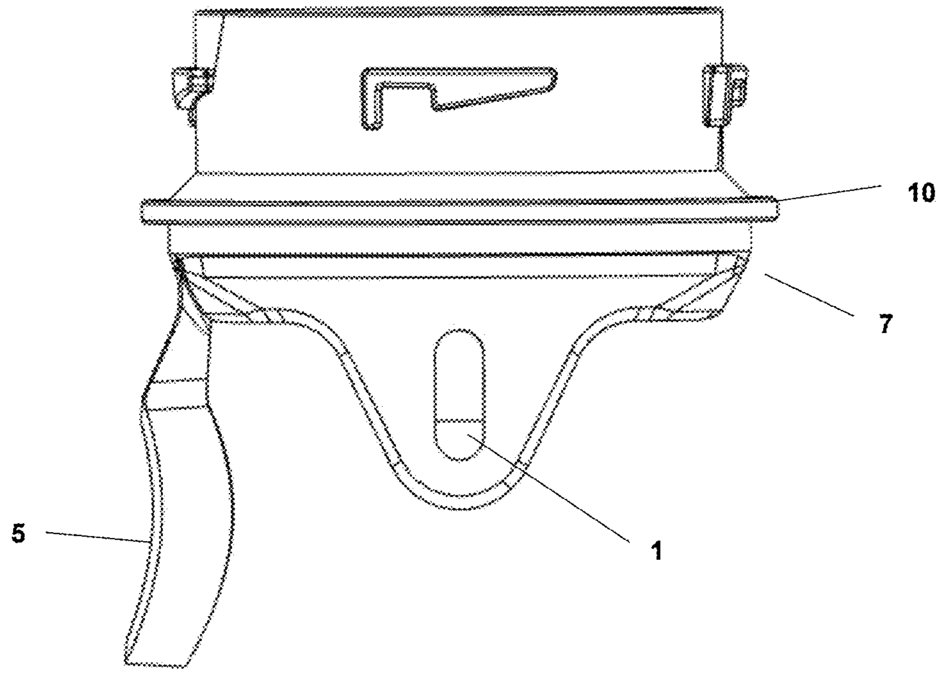
FIG. 10 shows a side view of a top adapter of a device as disclosed herein, which includes a removal tab. The adapter is symmetric such that an opposite side view is a mirror view of the view shown in FIG. 10.
Figure 11:
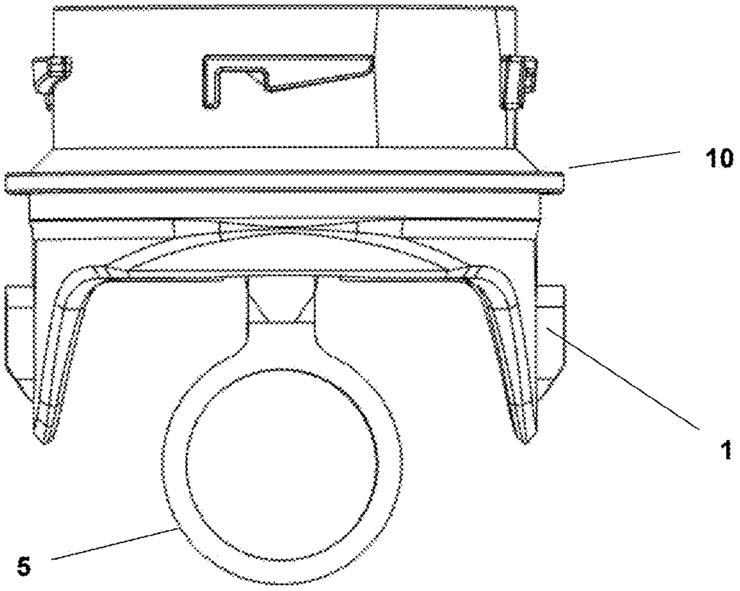
FIG. 11 shows a front view of the top adapter shown in FIG. 10.
Figure 12:
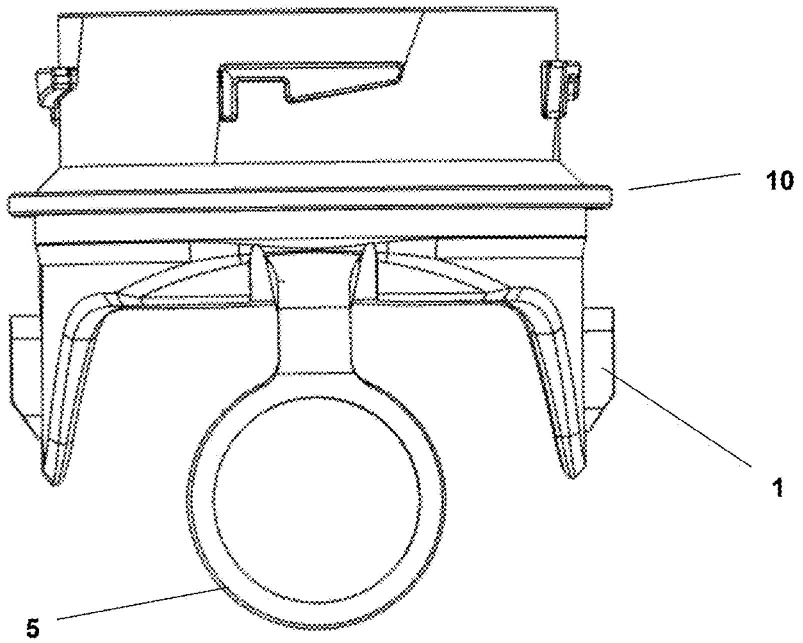
FIG. 12 shows a rear view of the top adapter shown in FIG. 10.
Figure 13:
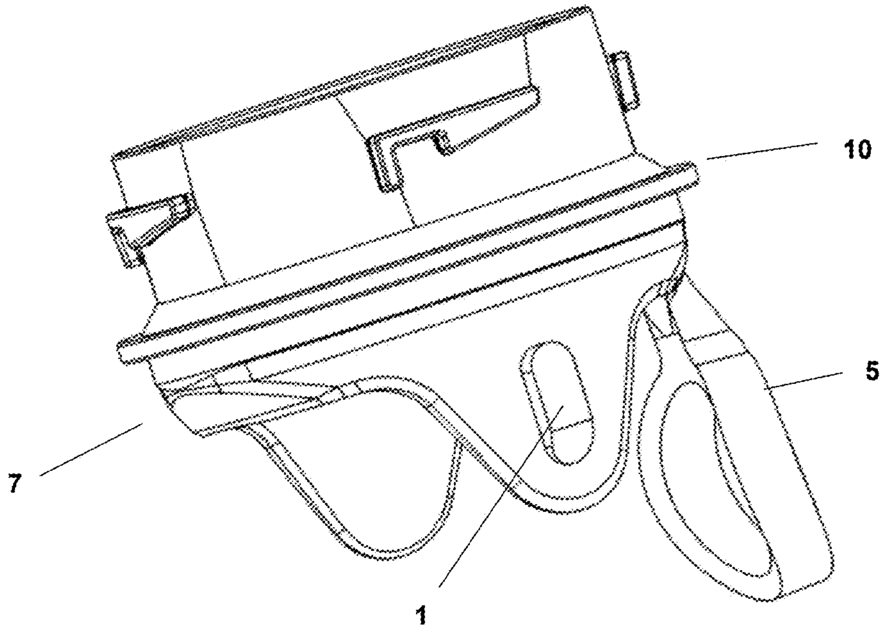
FIG. 13 is a perspective view of the top adapter shown in FIG. 10.

FIGS. 1-9 show various views of a device including a cylindrical body to which a adapter may be affixed as disclosed herein. The adapter may be secured via pressure interlocks as shown and described herein. Referring to FIGS. 7-9, a locking adapter as disclosed herein may include button sides 1 that bump out and over the paper tube and slot into the open holes 2 locking it into place. Conversely, the inner clip 3 bumps in and over the inner portion 4 of the cylindrical body, thereby locking it into place. The adapter clips onto both the inner and outer sides of the cylindrical body. The seal may be sufficiently tight that glue or other adhesive is not required to secure the adapter to the cylindrical body.

Figure 14:
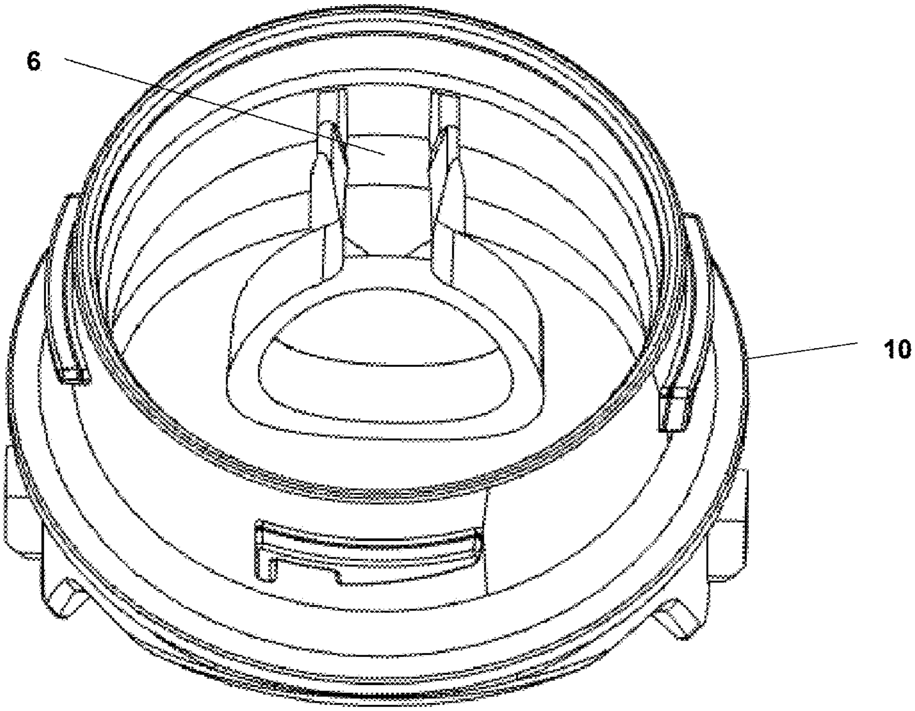
FIG. 14 is a perspective view of the top adapter shown in FIG. 10.
Figure 15:
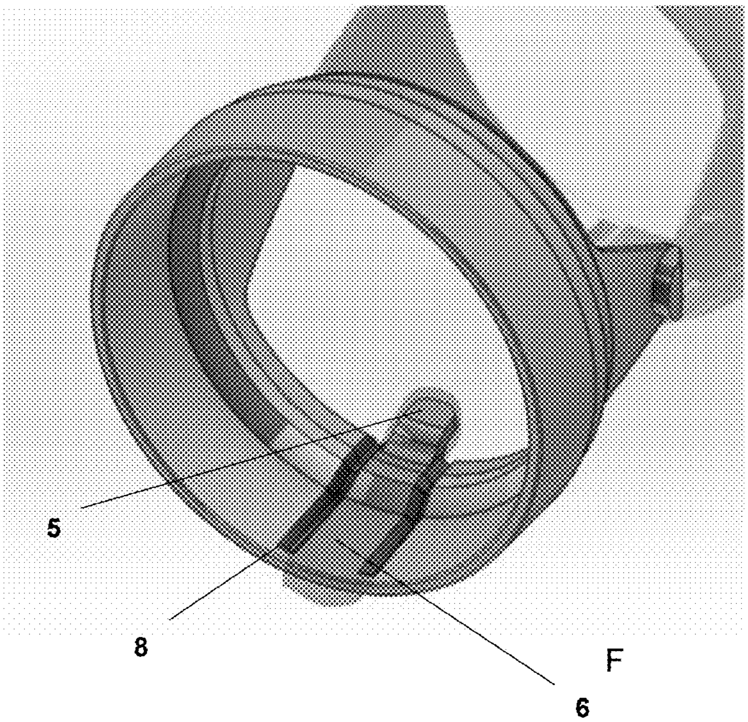
FIG. 15 is a perspective view of a locking top adapter as disclosed herein that includes a pull tab connected to a removable portion of the locking adapter.
Figure 16:
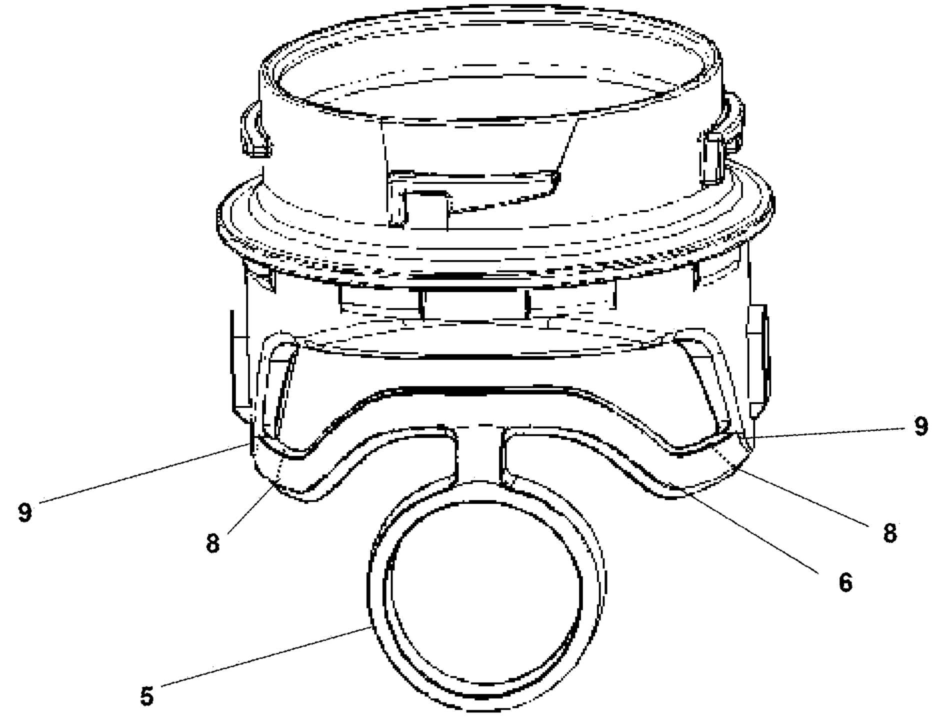
FIG. 16 is a perspective view of a locking top adapter as disclosed herein that includes a pull tab connected to a removable portion of the locking adapter.

In some embodiments, the locking adapter may not be removable, or may not be readily removable by a patient or other end user, unless/until a release tab is pulled. For example, as previously disclosed, the friction connection between the locking adapter and the cylindrical body may be sufficiently high that the two cannot be separated without damaging or destroying one or both components. Referring to FIGS. 10-17, an embodiment of a locking adapter as disclosed herein is shown that includes features such as a release tab 5, which may include a pull-ring. The release tab may be pulled by a user to allow for easier separation and removal of the locking adapter from the cylindrical body, for example at the end of life of the device to allow for separate recycling of the two components. Pulling the release tab also may remove a portion of the locking adapter, for example in a strip 6 as shown in FIGS. 14-15, or in a "webbing" or other destructively removable portion of the adapter as shown in FIG. 16. The removable portion may be separated from the rest of the locking adapter via, for example, one or more perforation lines 8, such as on either side of the strip shown in FIG. 15, or along the dotted lines as shown in FIG. 16. The perforation may be a series of punctures that extends entirely through the perforated portion of the locking adapter, or it may be a portion of the locking adapter that is thinner, weaker, made of a less-resilient material, or the like, while still having sufficient structural rigidity and strength to maintain the shape of the locking adapter in the cylindrical body until intentionally removed by a user. In some arrangements, the removeable portion may detach from the remainder of the locking adapter at a natural joint between the release tab or the removable portion, such as the inflection point 9 shown in FIG. 16. The strip, webbing, or other portion removed via the pull tab may be described as "destructively removeable" because the locking adapter may be rendered partially or entirely inoperable as a adapter for the container once the portion has been removed. For example, when a destructively removable portion of a locking adapter is removed via a pull tab as shown in FIGS. 10-17 or equivalent component, the locking adapter may no longer have sufficient structural integrity to be held in place within the cylindrical body. The inherent force of the cylindrical body may collapse the locking adapter, or the locking adapter may no longer deform the cylindrical body. As another example, removal of a destructively removable portion may cause the transitional area 7 to no longer exert sufficient force against the cylindrical body to hold the locking adapter in place. In some embodiments, the locking adapter may not be removable from the cylindrical body other than by damaging or destroying the locking adapter or the cylindrical body unless the destructively removable portion is first detached from the remainder of the locking adapter. For example, in some embodiments, depressing the button(s) 1 may not allow the locking adapter to be removed from the cylindrical body unless the destructively removable portion is detached first. In some embodiments, the button(s) 1 may be omitted entirely, in which case the locking adapter may still be removed via detachment of the destructively removable portion.

As previously disclosed, this embodiment also may include one or more buttons 1, which may be disposed on one or more connecting arms as shown. Embodiments disclosed herein may include any number of connecting arms, some or all of which may include buttons. It may be preferred to use two connecting arms, though any number may be used. In some embodiments, the side buttons 1 may be depressed to allow for removal of the locking adapter from the cylindrical body, either alone or in conjunction with a release tab 5 as previously disclosed.

As previously disclosed, a locking adapter as disclosed herein may deform the cylindrical body, for example into an ovaloid shape, such that it passes over the side buttons and connecting arms. In some embodiments, the locking adapter may have a transitional area 7 where the tube can stay outside the body, thereby allowing for easier insertion of the connecting arms, buttons, and surrounding areas of the locking adapter. For example, the transition area 7 may have an outer surface that is curved as shown, i.e., with a convex portion oriented toward the cylindrical body and pressing against the interior of the cylindrical body, instead of being vertical or essentially parallel to the sides of the cylindrical body. The transitional area may extend around the entire circumference of the locking adapter, or it may be present only on a portion of the circumference.

Still referring to FIGS. 10-17, the locking adapter may include a flared base 10 having a largest portion that is equal to or greater in circumference than the circumference of the cylindrical body to which the locking adapter is attached. The portion of the locking adapter above the flared base, i.e., outside the cylindrical body when the two are attached, may include a threaded portion and other features to allow for the child-protective cap to be removably attached to the locking adapter. The portion of the locking adapter below the flared base may be disposed entirely within the locking adapter when the two are connected.

Figure 17:
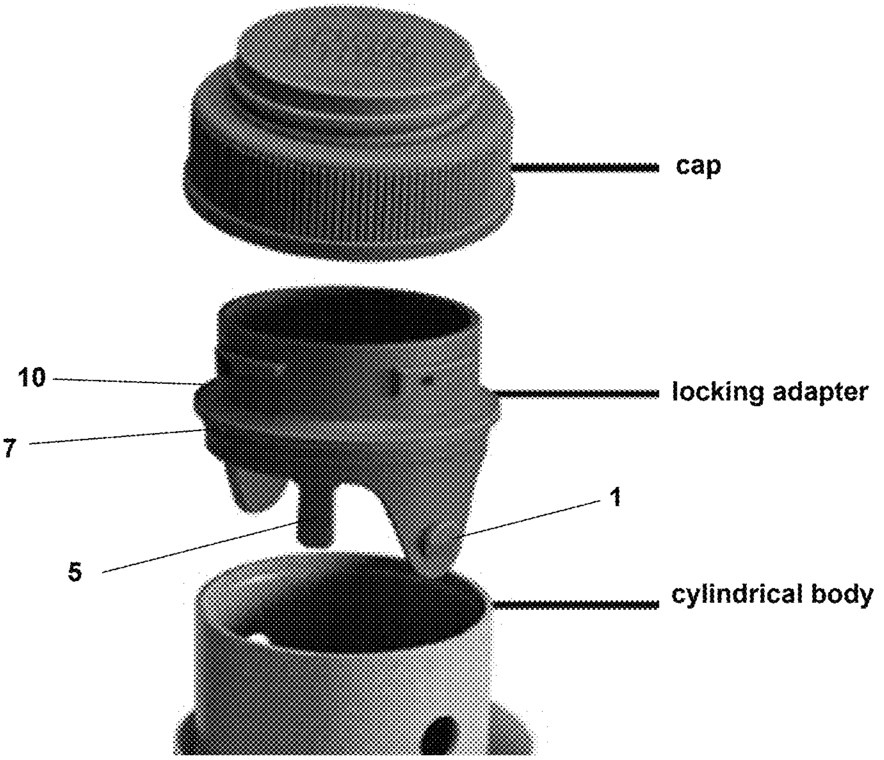
FIG. 17 is an exploded view of a cap, locking adapter, and cylindrical body as disclosed herein.

FIG. 17 shows an exploded view of a cap, locking adapter, and cylindrical body as disclosed herein and as shown in FIGS. 1-16. As previously disclosed, to assemble a complete container, the locking adapter may be inserted into the cylindrical body, which may cause the cylindrical body to deform slightly, thereby holding the locking adapter in place. The locking adapter also may include one or more buttons 1 that protrude through holes in the cylindrical body as shown. The locking adapter may include a tab or other dedicated portion that may be grasped by a user and pulled to remove a destructively removable portion of the locking adapter, thereby allowing for removal of the locking adapter, for example when the container is no longer in use and ready for disposal or recycling. The locking adapter may include or omit any of the features previously disclosed with respect to FIGS. 1-16, in any combination.

Embodiments disclosed herein may allow for the use of materials other than conventional plastic in medication containers and other similar containers. This may provide various benefits over conventional plastic containers. For example, oral medications typically are only tested for thermal stability up to 40 C/104° F. to demonstrate stability at room temperature. However, shipping and transit of medications, which is becoming more popular and more common, can result in medications experiencing temperatures above this range. For example, when medications are shipped in delivery trucks, shipping containers, or the like, or when they are awaiting delivery or pickup such as at a loading dock, storage area, house porch, or the like, they may be subjected to much higher temperatures. It has been found that the use of a paper-based cylindrical body as disclosed herein results in a much lower temperature change. Table I shows experimental data showing the temperature changes over time for a paper tube and locking adapter as disclosed herein, a conventional plastic container, and a comparison to the ambient environment. Over the test runs, the average temperature rose from 67.25° to 115.928° F. The paper tube showed an internal temperature change of 17.778° less than ambient and 11.928° less than the plastic tube; the plastic tube exhibited an average internal change only 5.85° less than ambient. The paper tube device on average and in each test results in a much lower temperature change than the conventional tube. Embodiments disclosed herein may provide containers including a locking adapter and cylindrical body which, when attached, exhibit a temperature rise of not more than about 95-100° F., inclusive of any intermediate value, when placed in an ambient temperature of greater than 114-117° F. Alternatively or in addition, the container may exhibit a temperature change of 10-20° less than a concurrent rise in ambient temperature. For example, if the ambient temperature increases by 60°, the internal temperature of the container may increase by only 40-50°.

TABLE I

| | | Ambient (° F.) | Paper Tube (° F.) | Plastic Tube (° F.) |
|---|---|---|---|---|
| Test 1 | 0 minutes | 68.792 | 69.242 | 69.35 |
| | 30 minutes | 117.05 | 99.5 | 111.2 |
| Test 2 | 0 minutes | 68.9 | 70.25 | 70.25 |
| | 30 minutes | 114.242 | 96.8 | 109.742 |
| Test 3 | 0 minutes | 64.058 | 65.408 | 65.084 |
| | 30 minutes | 116.492 | 98.15 | 109.292 |

Embodiments disclosed herein may have any suitable dimensions, such as outer diameter, total height, height of the cylindrical body, and the like. It may be preferable for the maximum dimensions not to exceed the standard dimensions of conventional plastic medication bottles typically used in pharmacies to fill prescriptions, to allow for use in existing infrastructure.

The locking adapter disclosed herein may be fabricated from virgin plastic or recycled content plastic. The holes used for the side buttons 1 also may vary, though it may be preferred for the shape of the holes to be oblong or pill-shaped to allow for maximized edge-to-edge contact so that the joint cannot be twisted out of place.

The embodiments shown and described herein are illustrative and embodiments according to the invention disclosed herein may include additional features and/or may exclude various features shown and described that are optional or otherwise not required to implement the devices disclosed herein.

What is claimed is:

1. A device comprising:
- a cylindrical body;
- a single-piece locking adapter affixed to a first end of the cylindrical body, the locking adapter comprising:
  - an interior portion that extends into the interior of the cylindrical body;
  - a transition region having a curved cross-section that extends into the interior of the cylindrical body when the locking adapter is affixed to the cylindrical body, wherein a first portion of the transition region closer to the first end of the cylindrical body has a larger circumference than a second portion of the transition region that extends further into the cylindrical body, and wherein the transition region is continuous around the circumference at the first end;
  - a flared base disposed outside the cylindrical body and in physical contact with the first end of the cylindrical body, the flared base having a sufficiently large diameter to prevent the flared base from being inserted in the cylindrical body; and
  - a threaded portion extending axially away from the flared base and the cylindrical body, the threaded portion comprising one or more threads that interlock with a protective cap to be removably attached to the threaded portion;
- wherein the cylindrical body comprises paper, cardboard, paper stock, or a combination thereof.

2. The device of claim 1, wherein the locking adapter further comprises a destructively removable portion that, when removed from the remainder of the locking adapter, allows the locking adapter to be removed from the cylindrical body.

3. The device of claim 2, wherein the destructively removable portion of the locking adapter is separated from the remainder of the locking adapter via one or more perforated regions.

4. The device of claim 3, wherein the perforated region comprises a different material than other portions of the locking adapter.

5. The device of claim 1, wherein the device exhibits a temperature change of 10-20° less than a concurrent rise in ambient temperature.

6. The device of claim 1, wherein the interior portion further comprises:
- one or more arm portions; and
- one or more buttons, each button of the one or more buttons being disposed on a corresponding one of the one or more arm portions such that the each button extends through a corresponding hole in the cylindrical body.

7. A locking adapter configured to attach to a cylindrical body, the locking adapter comprising:
- a flared base having a first circumference;
- a transition region having a curved cross-section that extends into the interior of the cylindrical body when the locking adapter is attached to the cylindrical body, wherein a first portion of the transition region closer to the flared base has a second circumference that is smaller than the first circumference and greater than a third circumference of a second portion of the transition region farther away from the flared base, wherein the transition region is continuous around the second circumference;
- a threaded portion extending axially away from the flared base in the opposite direction from the transition region, the threaded portion comprising one or more threads that interlock with a protective cap to be removably attached to the threaded portion,
- wherein the cylindrical body comprises paper, cardboard, paper stock, or a combination thereof.

8. The locking adapter of claim 7, further comprising a destructively removable portion that, when removed from the remainder of the locking adapter, allows the locking adapter to be removed from the cylindrical body.

9. The locking adapter of claim 8, wherein the destructively removable portion of the locking adapter is separated from the remainder of the locking adapter via one or more perforated regions.

10. The locking adapter of claim 9, wherein the perforated region comprises a different material than other portions of the locking adapter.

11. The locking adapter of claim 7, further comprising:
- one or more arm portions that extend into the interior of the cylindrical body when the locking adapter is attached to the cylindrical body; and
- one or more buttons, each button of the one or more buttons being disposed on a corresponding one of the one or more arm portions such that the each button extends through a corresponding hole in the cylindrical body when the locking adapter is attached to the cylindrical body.

* * * * *